(12) United States Patent
Zemenchik

(10) Patent No.: US 10,440,877 B2
(45) Date of Patent: Oct. 15, 2019

(54) RESIDUE MANAGEMENT BASED ON TOPOGRAPHY BY AN AGRICULTURAL TILLAGE IMPLEMENT

(71) Applicant: CNH Industrial America LLC, New Holland, PA (US)

(72) Inventor: Robert A. Zemenchik, Kenosha, WI (US)

(73) Assignee: CNH Industrial America LLC, New Holland, PA (US)

( * ) Notice: Subject to any disclaimer, the term of this patent is extended or adjusted under 35 U.S.C. 154(b) by 225 days.

(21) Appl. No.: 15/240,732

(22) Filed: Aug. 18, 2016

(65) Prior Publication Data

US 2018/0049361 A1    Feb. 22, 2018

(51) Int. Cl.
*A01B 63/00* (2006.01)
*A01B 49/02* (2006.01)
*A01B 63/28* (2006.01)

(52) U.S. Cl.
CPC .......... *A01B 63/008* (2013.01); *A01B 49/027* (2013.01); *A01B 63/28* (2013.01)

(58) Field of Classification Search
CPC ..... A01B 63/111; A01B 63/008; A01B 63/24; A01B 63/28; A01B 63/32
See application file for complete search history.

(56) References Cited

U.S. PATENT DOCUMENTS

| | | | | |
|---|---|---|---|---|
| 3,433,307 A * | 3/1969 | Gilbert | ................... | A01B 63/24 172/4 |
| 4,250,970 A * | 2/1981 | Pfenninger | ............ | A01B 63/32 172/142 |
| 4,865,132 A * | 9/1989 | Moore, Jr. | ............ | A01B 13/08 172/196 |
| 5,764,511 A | 6/1998 | Henderson | | |
| 5,961,573 A | 10/1999 | Hale et al. | | |
| 5,995,895 A | 11/1999 | Watt et al. | | |
| 6,434,462 B1 | 8/2002 | Bevly et al. | | |
| 6,655,465 B2 | 12/2003 | Carlson et al. | | |
| 8,544,398 B2 | 10/2013 | Bassett | | |
| 8,573,319 B1 | 11/2013 | Casper et al. | | |
| 8,657,023 B2 | 2/2014 | Casper et al. | | |
| 8,746,361 B2 | 6/2014 | Hake et al. | | |
| 8,794,344 B2 * | 8/2014 | Blunier | ................... | A01B 63/32 111/200 |
| 8,827,001 B2 | 9/2014 | Wendte et al. | | |
| 8,857,530 B2 | 10/2014 | Henry | | |
| 9,113,589 B2 | 8/2015 | Bassett | | |
| 9,282,688 B2 * | 3/2016 | Casper | ................... | H04N 7/183 |
| 9,554,098 B2 * | 1/2017 | Casper | ................... | H04N 7/181 |
| 2003/0127235 A1 | 7/2003 | Dannigkeit | | |

(Continued)

*Primary Examiner* — Matthew Troutman
(74) *Attorney, Agent, or Firm* — Rebecca L. Henkel; Rickard K. DeMille

(57) ABSTRACT

An agricultural tillage system including a carriage frame assembly, a plurality of tillage elements coupled to the carriage frame assembly, an actuator and a residue reactive system. The actuator is moveably coupled to the tillage elements, and is directly in control of a soil contact depth of the tillage elements. The residue reactive system is in controlling communication with the at least one actuator. The residue reactive system reduces the soil contact depth of the tillage elements when the residue mass on the soil is reduced and/or the slope of the soil is above a predetermined value.

10 Claims, 7 Drawing Sheets

(56) References Cited

U.S. PATENT DOCUMENTS

| | | | |
|---|---|---|---|
| 2014/0054051 A1 | 2/2014 | Landoll et al. | |
| 2014/0060869 A1* | 3/2014 | Blunier | A01B 63/32 |
| | | | 172/326 |
| 2015/0296701 A1 | 10/2015 | Anderson | |
| 2015/0305224 A1* | 10/2015 | Casper | H04N 7/183 |
| | | | 701/50 |
| 2016/0134844 A1* | 5/2016 | Casper | H04N 7/181 |
| | | | 348/135 |
| 2017/0251587 A1* | 9/2017 | Sporrer | A01B 5/04 |
| 2018/0070525 A1* | 3/2018 | Adams | A01C 7/203 |

\* cited by examiner

US 10,440,877 B2

RESIDUE MANAGEMENT BASED ON TOPOGRAPHY BY AN AGRICULTURAL TILLAGE IMPLEMENT

BACKGROUND OF THE INVENTION

1. Field of the Invention

The present invention relates to agricultural implements, and, more particularly, to agricultural field tillage implements.

2. Description of the Related Art

Farmers utilize a wide variety of tillage implements to prepare soil for planting. Some such implements include two or more sections coupled together to perform multiple functions as they are pulled through the fields by a tractor. For example, a cultivator/harrow combination, which is capable of simultaneously tilling and leveling of the soil in preparation for planting, may be pulled by the tractor.

In one type of tilling operation, rows or gangs of circular disk blades are pulled through the soil at variable depths to break up clods of soil, as well as size and mix crop residue to provide a more amenable soil structure and condition for planting and to level the soil surface. The gangs of disks are arranged on frames that extend generally laterally with respect to the direction of movement through a field and more particularly are angled with respect to the direction of movement.

The tillage elements used in a tillage implement have a soil engaging depth that is controlled by way of a hydraulic control available to the operator. For combination tillage tools, the depth of the individual elements may be independently set by the operator moving the hydraulic control to lower or raise any or all of the tillage elements. For example, the depth of the ripper shanks is often adjusted by lowering or raising support wheels of the implement. At the same time the disk gang operating depth may be raised, lowered, or left alone. When the implement draft increases, for example on a slope or a wet area, the operator can reduce the soil depth of any of the tillage elements to allow the tractor to pull the implement through the field abnormality.

When residue mass on the field is reduced it is generally a good practice to reduce the tilling depth of the implement so that the soil closest to the surface has a consistent mixture of crop residue with the rest of the field and target soil coverage may be achieved for adequate soil conservation where slopes vary.

What is needed in the art is a tilling implement that adjusts residue incorporation in response to pre-determined crop residue mass and field topography.

SUMMARY OF THE INVENTION

The present invention provides a tillage implement with a reactive depth control system to control the soil depth of tillage elements.

In one form, the invention is an agricultural tillage system including a carriage frame assembly, a plurality of tillage elements coupled to the carriage frame assembly, an actuator and a residue reactive system. The actuator is moveably coupled to the tillage elements, and is directly in control of a soil contact depth of the tillage elements. The residue reactive system is in controlling communication with the at least one actuator. The residue reactive system reduces the soil contact depth of the tillage elements when the residue mass on the soil is reduced and/or the slope of the soil is above a predetermined value. Conversely, when the crop residue mas increases or the soil slope decreases, the tillage elements may be adjusted to be more aggressive.

In another form, the invention is a depth control system for an agricultural tillage system having a carriage frame assembly, a plurality of tillage elements coupled to the carriage frame assembly. The depth control system has an actuator and a residue reactive system. The actuator is moveably coupled to the tillage elements, and is directly in control of a soil contact depth of the tillage elements. The residue reactive system is in controlling communication with the at least one actuator. The residue reactive system reduces the soil contact depth of the tillage elements when the residue mass on the soil is reduced/increased and/or the slope of the soil is above/below a predetermined value.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
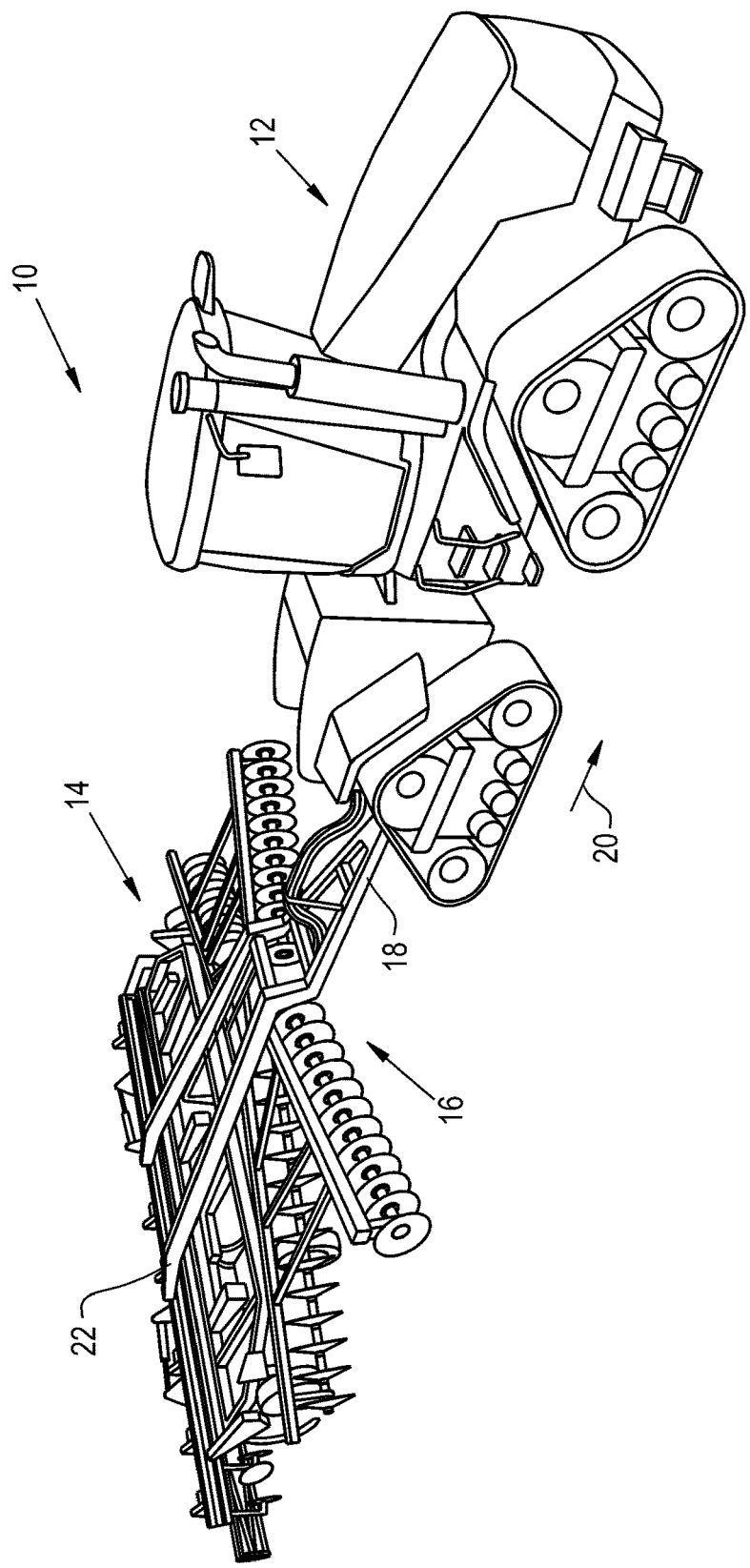
FIG. 1 illustrates an embodiment of a tillage implement of the present invention being pulled by a tractor, the implement using an embodiment of a depth control method of the present invention.
Figure 2:
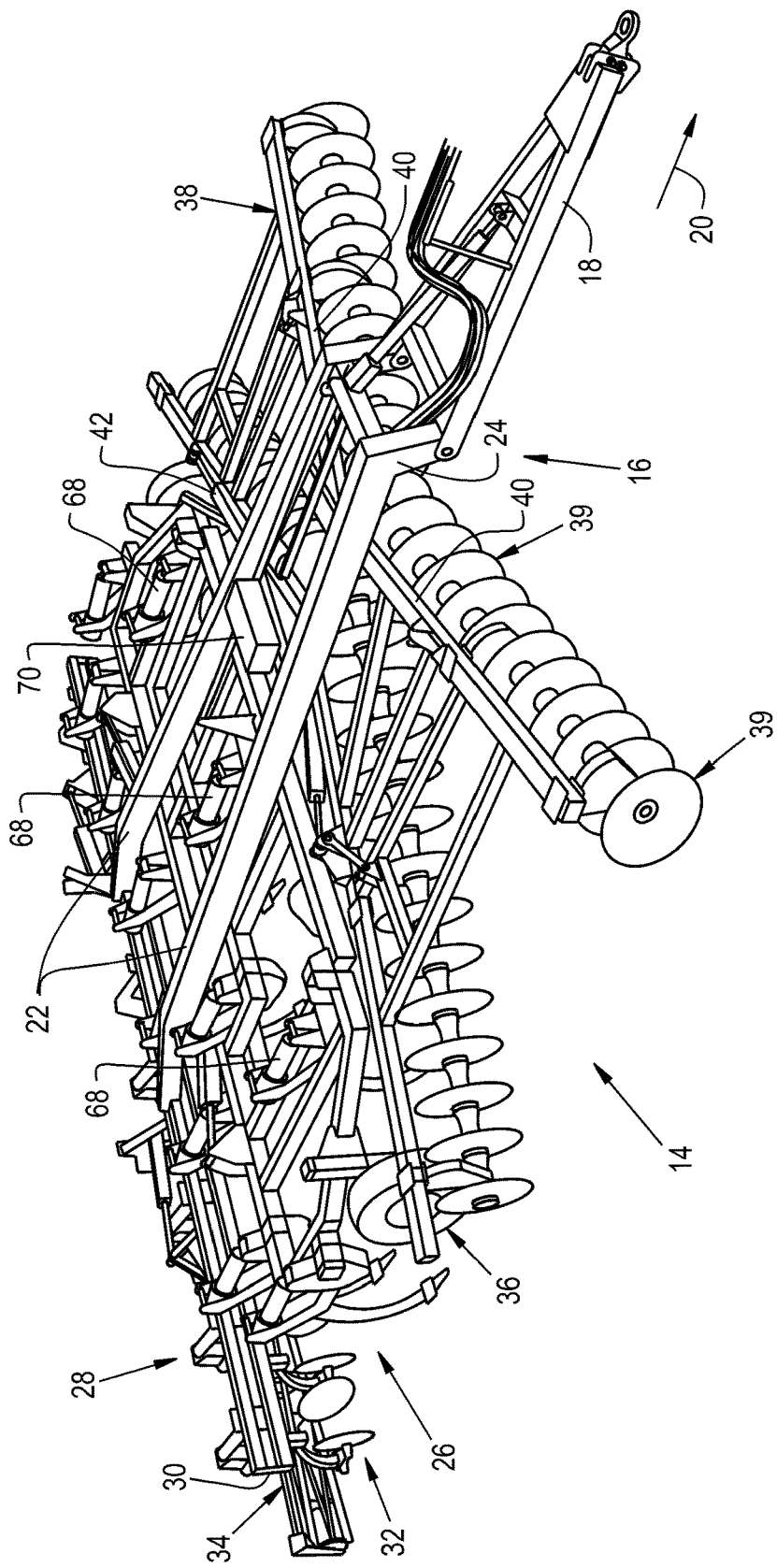
FIG. 2 is a perspective view of the tillage implement of FIG. 1.

Referring now to the drawings, and more particularly to FIGS. 1 and 2, there is shown a tillage apparatus 10 which generally includes a tractor 12 and an agricultural tillage implement 14 for tilling and finishing soil prior to seeding.

Agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft directed carrier frame members 22, which are coupled with and extend from pull hitch 18. Reinforcing gusset plates 24 may be used to strengthen the connection between pull hitch 18 and carrier frame members 22. Carriage frame assembly 16 generally functions to carry a shank frame 26 for tilling the soil, and a rear implement 28 for finishing the soil. Shank frame 26 includes a plurality of arcuate or parabolicly shaped shanks with tilling points at their lower end for tilling the soil. Rear implement 28 includes a secondary frame 30, leveling blades 32 and rolling (aka, crumbler) basket assemblies 34, which coact with each other to finish the soil in preparation for planting. Leveling blades 32 and rolling basket assemblies 34 are both attached to secondary frame 30.

Wheels 36, only one of which is shown, are actuated from tractor 12 to raise or lower the carrier frame members 22 to place the tillage implement 14 in a transport position with the wheels 36 supporting the implement above the ground and an operating position in which the tillage implement 14 is used to till the soil.

Carrier frame members 22 also carry a disk frame assembly 38 which provides support for gangs of disk blades 39 positioned forward from shank frames 26. The disk frame assembly 38 includes forward and aft frame members 40 and 42, respectively, to which the gangs of disk blades 39 are connected.

Figure 3:
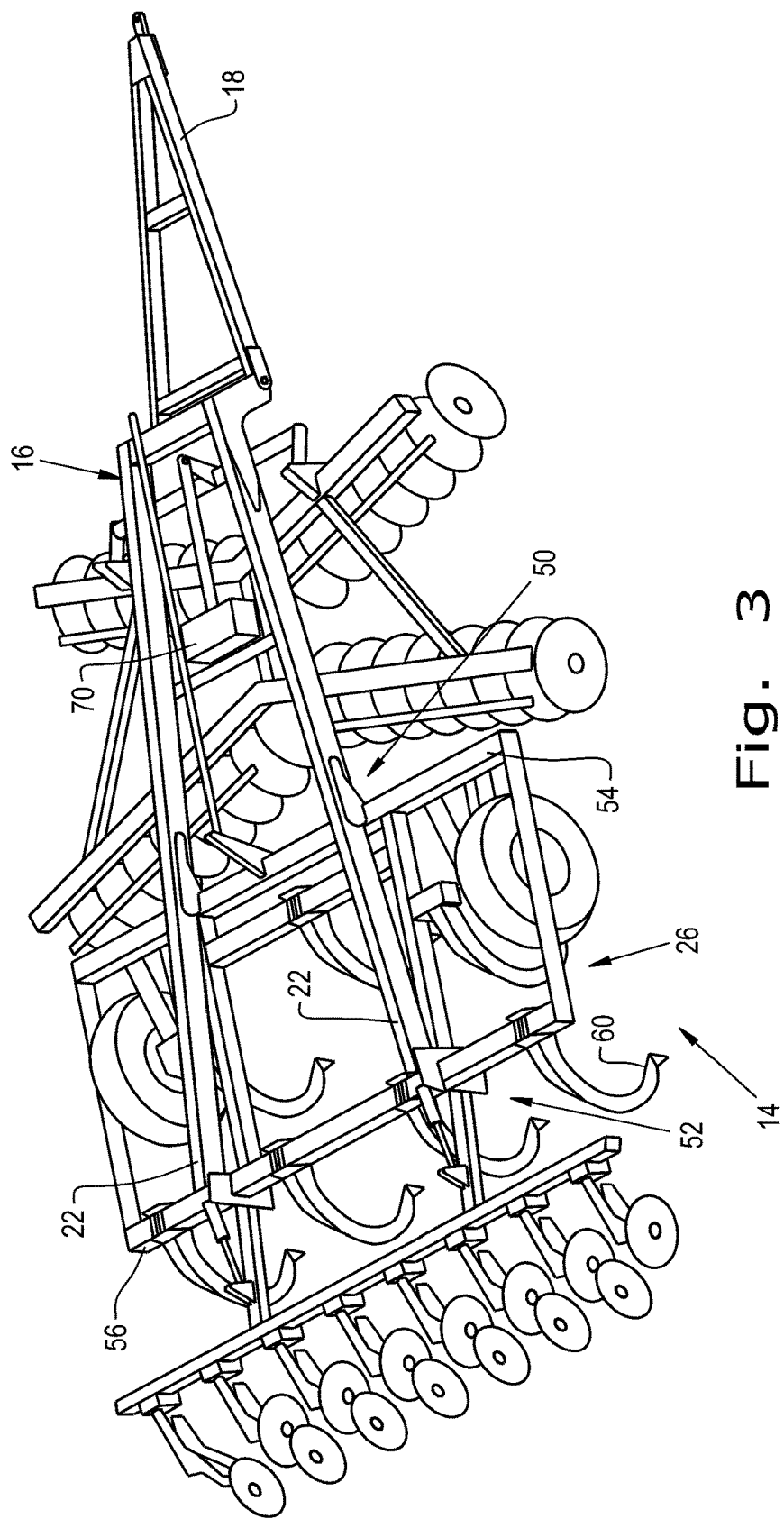
FIG. 3 is another perspective view of the tillage implement of FIGS. 1 and 2.
Figure 4:
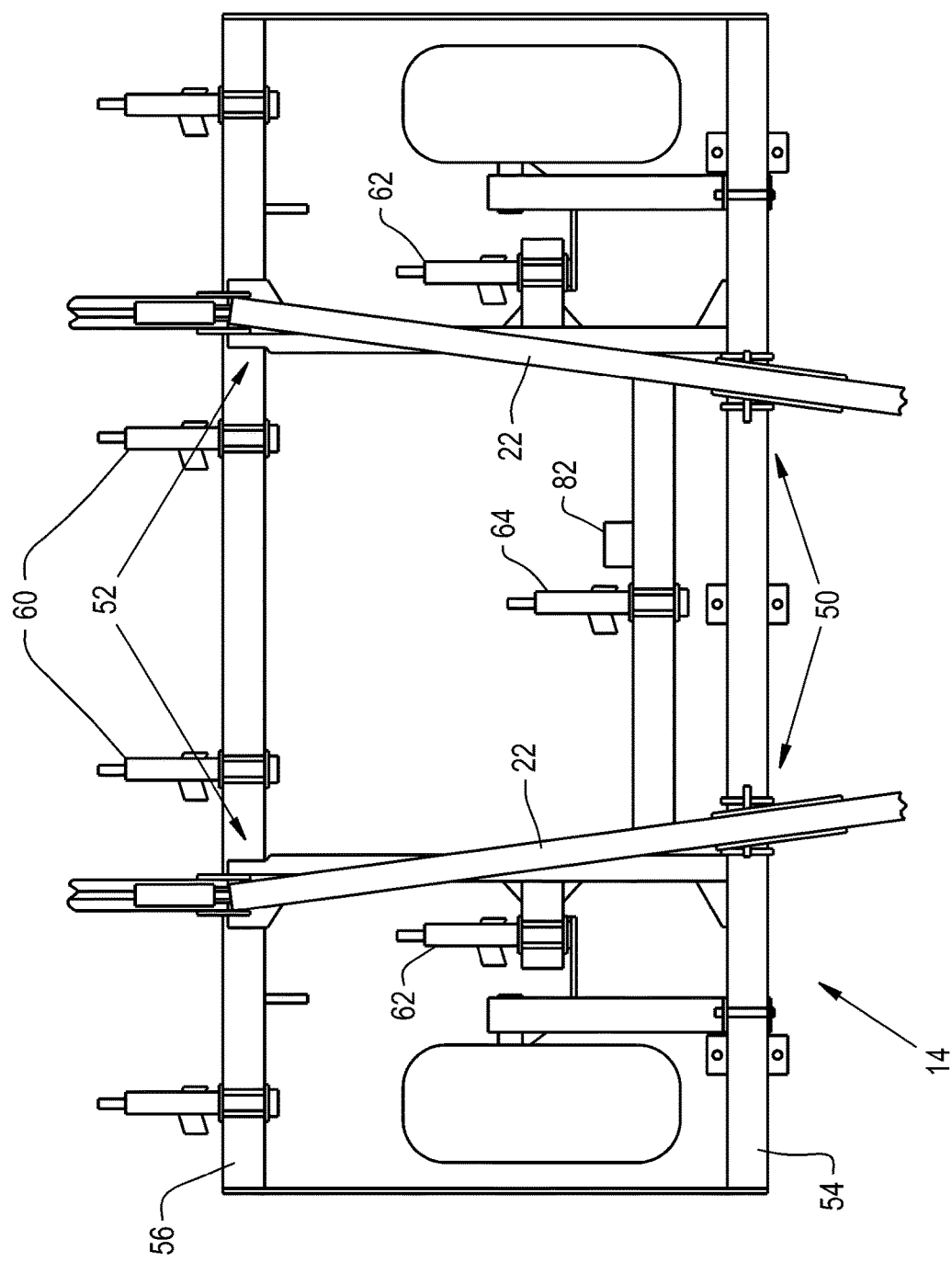
FIG. 4 is a fragmentary top view of the tillage implement shown in FIGS. 1-3.
Figure 5:
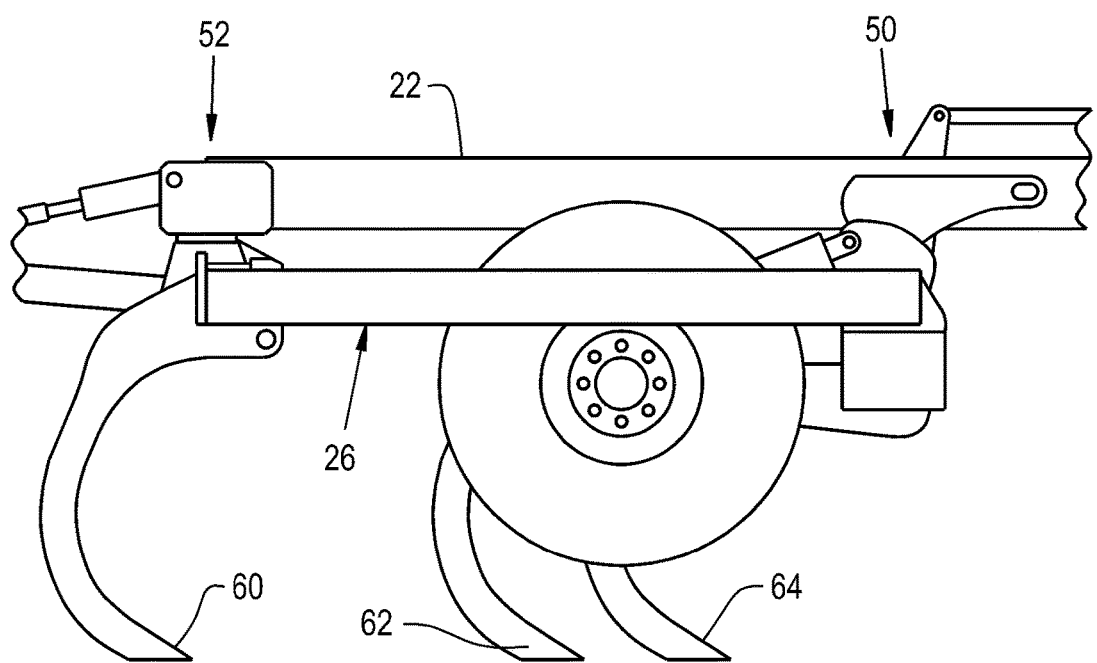
FIG. 5 is a fragmentary side view of the tillage implement shown in FIGS. 1-4.

Referring now to FIGS. 3-5, shank frame 26 is coupled with carrier or longitudinal frame members 22 using a pair of horizontal attachment arrangements 50 at the front of shank frame 26, and a pair of rear attachment arrangements 52 at the rear of shank frame 26. More particularly, shank frame 26 includes a front cross member 54 and a rear cross member 56 which are each disposed under the pair of longitudinal frame members 22.

A rear set of shanks 60 are coupled to attachment arrangement 52, with shanks 62 located at a mid-position and shank 64 is located in a fore position relative to travel direction 20. Fore shank 64 is referred to as a scout shank 64 in that scout shank 64 leads all of the shanks 60 and 62 as it encounters soil first in the direction of travel 20. Shanks 60, 62 and 64, disc blades 39 and leveling elements 32 and 34 are all tillage elements and tillage elements can include other soil encountering elements not illustrated herein, but known in the art.

During field operation, shanks 60, 62 and 64 extending downwardly from shank frame 26 dig into the soil and may be configured as sub-soiling shanks to break up the hard pan at a particular depth below the surface of the soil. Actuators 68 are used to control the depth that tillage elements 32, 34, 39, 60, 62 and 64 penetrate the soil. Additionally, or instead of actuators 68, a spring pack 70 can control the soil contact depth. For purposes herein spring pack 70 can also be considered an actuator 68 or 70 used to control the soil contact depth of the tillage elements 32, 34, 39, 60, 62 and 64.

Figure 6:
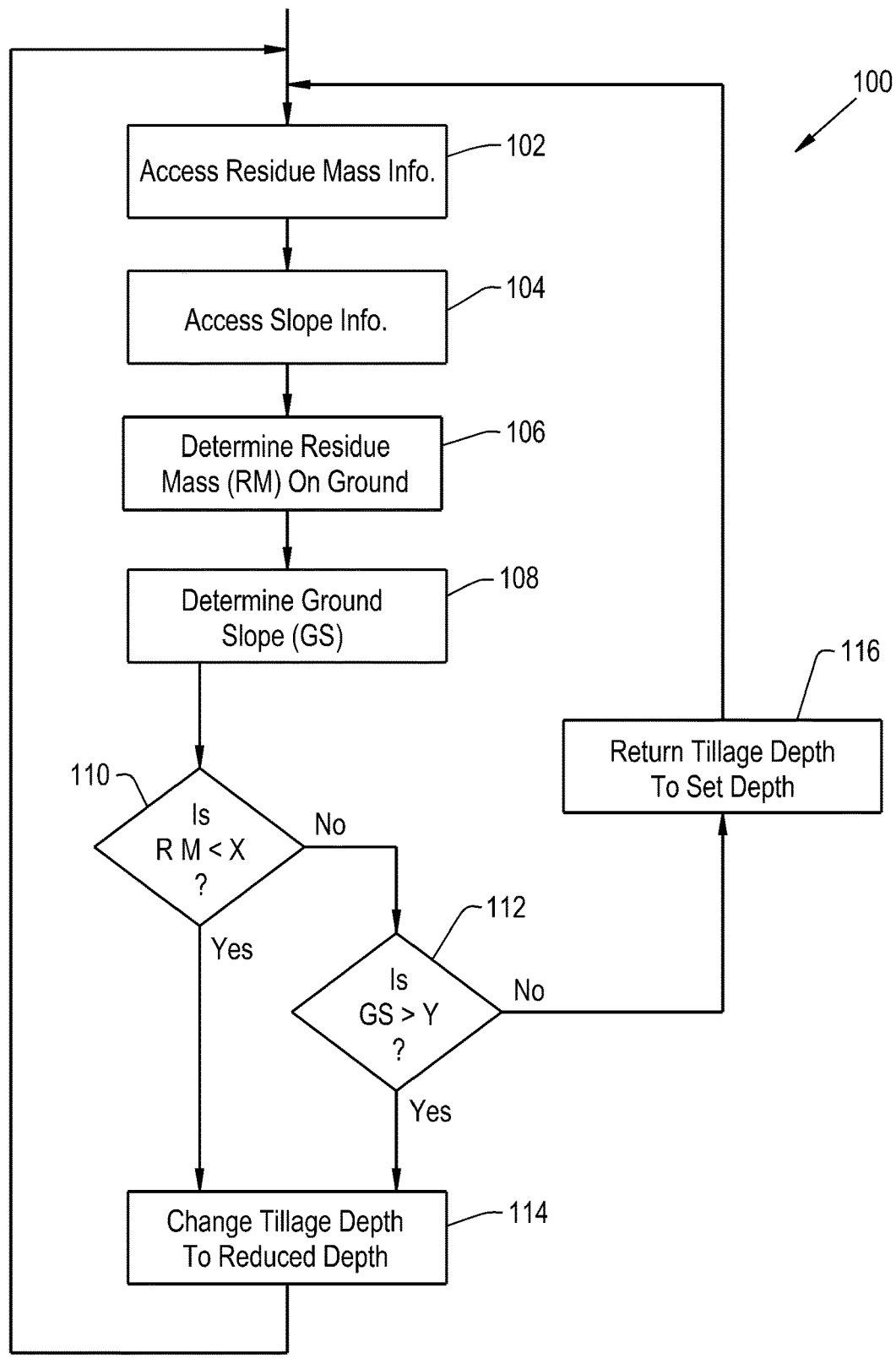
FIG. 6 is a flowchart illustrating the depth control method used by the implement of FIGS. 1-5.
Figure 7:
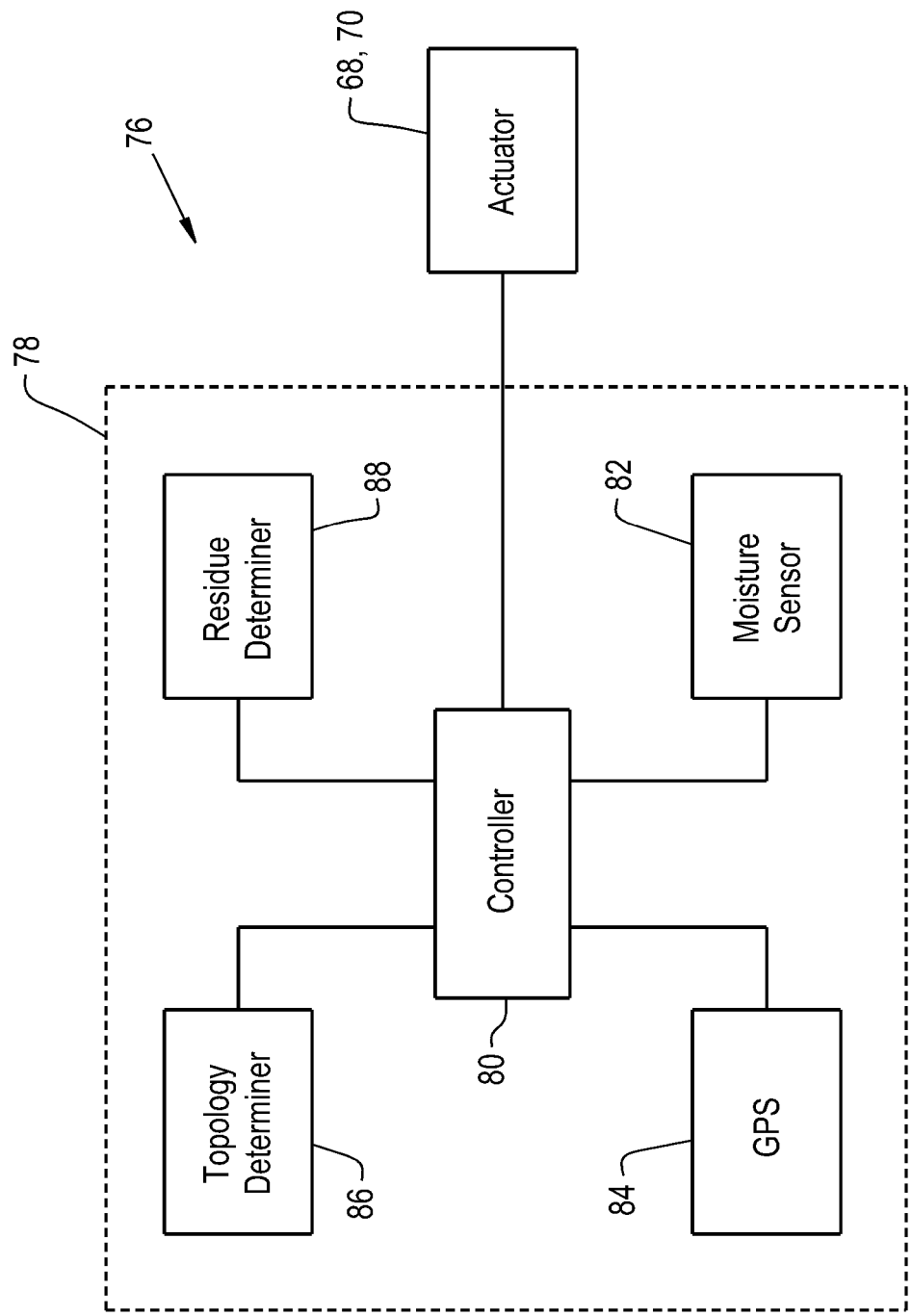
FIG. 7 is a schematical block diagram illustrating the interconnections of elements of the depth control system of the present invention using the method of FIG. 6.

Now, additionally referring to FIGS. 6 and 7 there is illustrated a depth control system 76 including a residue reactive system 78 coupled to actuators 68 and 70. Residue reactive system 78 includes a controller 80, a moisture sensor 82, a Global Positioning System (GPS) 84, a topology determiner 86 and a residue determiner 88. Moisture sensor 82 is located proximate to scout shank 64 and determines the moisture in the soil that scout shank 64 is bringing to the surface. The moisture sensor 82 produces a signal representative of the moisture in the soil and this signal is sent to controller 80 to alter the depth of the tillage elements. Since scout shank 64 leads the other shanks it is advantageous that the moisture be determined by the lead shank so that the other following shanks can have their depth adjusted in anticipation of the soil conditions just ahead of them in the direction of travel 20. So if the moisture content is above a predetermined level then the tillage depth can be lessened for the rest of tillage elements. Likewise if the moisture level is lower then the depth of the tillage elements can be adjusted correspondingly.

Residue determiner 88 can be a sensor system that detects the amount of residue on the surface of the ground proximate to implement 14 or tractor 12. In the preferred embodiment residue determiner 88 estimates the residue mass by calculation using the harvest index applied to and reported from the combine yield data of the previously harvested crop. The harvest index may be in the form of a yield map (discussed below) that provides the crop yield by geographic position. It is assumed that residue mass is proportional to crop yield, so the amount of residue mass is estimated as being proportional to the localized crop yield by the residue determiner 88. Since the crop yield varies by location the residue mass varies and this geographically sensitive value is provided to controller 80 by residue determiner 88.

Controller 80 may be a stand-alone controller (in communication with other controls), or the functions thereof may be incorporated into another controller that may be part of tractor 12 or implement 14. Controller 80 carries out the functions of method 100 as well as the already discussed moisture reactive aspect.

Method 100 is carried out by depth control system 76, wherein residue mass information relative to positions in the field to be tilled and slope information relative to positions in the field as well are accessed at steps 102 and 104. The residue mass information may be in the form of a yield map which indicates crop yield by locations within the field. The yield information is gathered and saved by the harvesting unit when the crop is being removed. Where the yield is higher then the residue is proportionately higher. Likewise in sections of the field where the yield is lower the residue is likely lower.

At step 106, residue determiner 88 uses input from step 102, which for example is the yield map, and computes the residue mass (RM) on the ground based on the location of implement 14 with input from GPS 84. Since direction 20 is known controller 80 can anticipate what depth to set tillage elements 39, 60, 62 and 64 when the RM changes based on the yield map. This can be done in a continuous resolution of depth or as illustrated in method 100 when the RM is less than a predetermined amount X of RM as in step 110. The residue mass is synonymous with residue cover percentage, which is calculated by using accepted field methods. The two phrases 'residue mass' and 'residue cover percentage' simply denote the amount of surface residue that is present on the ground of the field and using one phrase or the other are interchangeable.

Additionally, the ground slope is determined by topology determiner 86 at step 108. The topological features of the field are availed at step 104 where the slope features are accessed by controller 80. The topological features may be in the form of a topological map with slope information for differing locations in the field. If the ground slope (GS) is greater than a predetermined amount Y at step 112, then method 100 proceeds to step 114.

At step 114 either the RM has decreased and/or the GS has increased, which causes the tillage depth of the tillage elements to change to a reduced depth. This is desirable so that more of the residue will remain on or close to the surface to reduce erosion in sloped areas and to keep the residue that is there close to the surface in lower yielding areas of the field. If the criteria of steps 110 and 112 are not met then method 100 proceeds to step 116 where the tillage depth of the tillage elements is reset to a predetermined or set depth.

Advantageously the present invention modifies the tillage depth of the tillage elements reactive to the residue mass and the slope of the field, to proactively work to improve the health and productivity of the soil. Another advantage is that the present invention can generally make use of currently available data and sensors to carry out the steps of method 100. Yet another advantage of the present invention is that the information to adjust the depth is available before the implement has arrived at the location that precedes it, so that the depth adjustment can be carried out in anticipation of the location of implement 14 as it travels across a field. This advantageously can be used to eliminate the reaction time of implement 14 to a change in depth as actuators 68 and/or 70 are activated.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage system, comprising:
   a carriage frame assembly;
   a plurality of tillage elements coupled to the carriage frame assembly;
   at least one actuator moveably coupled to the tillage elements, the actuator being directly in control of a soil contact depth of the tillage elements;
   a residue reactive system in controlling communication with the at least one actuator, the residue reactive system reduces the soil contact depth of the tillage elements when at least one of a residue mass on the soil is below a first predetermined value and a slope of the soil is above a second predetermined value; and
   a residue mass determiner that provides the residue reactive system with residue mass values for locations in a field of operation, the residue mass determiner includes a use of a yield map of the field, the residue mass on the soil being estimated from yield data of a previously harvested crop of the field at a geographic position of the agricultural tillage system.

2. The agricultural tillage system of claim 1, further comprising a topology determiner that provides the slope of the soil information to the residue reactive system for locations in the field.

3. The agricultural tillage system of claim 2, wherein the topology determiner includes a topological map of the field.

4. The agricultural tillage system of claim 3, further comprising a geographical positioning system coupled to the tillage system, the geographical positioning system providing location information in the field, the residue reactive system using the location information along with the yield map and the topological map to thereby determine a preferred depth of the tillage elements.

5. The agricultural tillage system of claim 4, wherein the residue reactive system causes the actuator to position the tillage elements proximate to the preferred depth of the tillage elements.

6. A depth control system for an agricultural tillage system having a carriage frame assembly and a plurality of tillage elements coupled to the carriage frame assembly, the depth control system comprising:
   at least one actuator moveably coupled to the tillage elements, the actuator being directly in control of a soil contact depth of the tillage elements;
   a residue reactive system in controlling communication with the at least one actuator, the residue reactive system reduces the soil contact depth of the tillage elements when a residue mass on the soil is below a predetermined value; and
   a residue mass determiner that provides the residue reactive system with residue mass values for locations in a field of operation, the residue mass determiner includes a use of a yield map of the field, the residue mass on the soil being estimated from yield data of a previously harvested crop of the field at a geographic position of the agricultural tillage system.

7. The depth control system of claim 6, further comprising a topology determiner that provides a slope of the soil information to the residue reactive system for locations in the field.

8. The depth control system of claim 7, wherein the topology determiner includes a topological map of the field.

9. The depth control system of claim 8, further comprising a geographical positioning system coupled to the tillage system, the geographical positioning system providing location information in the field, the residue reactive system using the location information along with the yield map and the topological map to thereby determine a preferred depth of the tillage elements.

10. The depth control system of claim 9, wherein the residue reactive system causes the actuator to position the tillage elements proximate to the preferred depth of the tillage elements.

* * * * *